United States Patent
Mao (10) Patent No.: US 12,382,484 B2
(45) Date of Patent: Aug. 5, 2025

(54) GATEWAY ACCESS METHOD AND ELECTRONIC DEVICE

(71) Applicant: VIVO MOBILE COMMUNICATION CO., LTD., Guangdong (CN)

(72) Inventor: Yuanze Mao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 458 days.

(21) Appl. No.: 17/954,689

(22) Filed: Sep. 28, 2022

(65) Prior Publication Data

US 2023/0027398 A1    Jan. 26, 2023

Related U.S. Application Data

(63) Continuation of application No. PCT/CN2021/084914, filed on Apr. 1, 2021.

(30) Foreign Application Priority Data

Apr. 8, 2020    (CN) .......................... 202010277683.0

(51) Int. Cl.
*H04W 72/56*    (2023.01)
*H04W 88/16*    (2009.01)

(52) U.S. Cl.
CPC ............ *H04W 72/56* (2023.01); *H04W 88/16* (2013.01)

(58) Field of Classification Search
CPC .............................. H04W 72/56; H04W 88/16
See application file for complete search history.

(56) References Cited

U.S. PATENT DOCUMENTS

| | | |
|---|---|---|
| 2017/0005914 A1 | 1/2017 | Edge et al. |
| 2017/0105155 A1 | 4/2017 | Zhao et al. |
| 2017/0164195 A1* | 6/2017 | Stammers ............. H04W 48/20 |
| 2017/0272991 A1 | 9/2017 | Karpov et al. |
| 2017/0374018 A1 | 12/2017 | Salkintzis |
| 2018/0091967 A1* | 3/2018 | Gupta ...................... H04W 8/02 |
| 2018/0139692 A1* | 5/2018 | Liu ........................ H04W 48/18 |

(Continued)

FOREIGN PATENT DOCUMENTS

| | | |
|---|---|---|
| CN | 106412148 A | 2/2017 |
| CN | 106470465 A | 3/2017 |
| CN | 110324870 A | 10/2019 |

(Continued)

OTHER PUBLICATIONS

EPDG Configuration Information for Emergency Services over WLAN, 3GPP TSG CT WG6 #79, C6-160040, Jeju, South Korea, pp. 15-18, Feb. 2016.

(Continued)

*Primary Examiner* — Won Tae C Kim
(74) *Attorney, Agent, or Firm* — Price Heneveld LLP (57) ABSTRACT

A gateway access method and an electronic device are provided. The gateway access method includes: determining a target ePDG based on a priority level of at least one pre-recorded evolved packet data gateway ePDG; and initiating an access procedure to the target ePDG based on pre-recorded address information; where the priority level includes a priority level that is determined based on access parameter information of the at least one ePDG; and the address information includes address information of the target ePDG.

12 Claims, 2 Drawing Sheets

(56) References Cited

U.S. PATENT DOCUMENTS

2019/0014520 A1    1/2019  Karpov et al.
2022/0240214 A1*  7/2022  Mao .................... H04L 61/4511

FOREIGN PATENT DOCUMENTS

| | | |
|---|---|---|
| CN | 110446242 A | 11/2019 |
| CN | 111491365 A | 8/2020 |
| CN | 112654073 A | 4/2021 |
| EP | 3340691 A1 | 6/2018 |
| JP | 2004201201 A | 7/2004 |
| JP | 2018525880 A | 9/2018 |
| JP | 2018530270 A | 10/2018 |
| WO | 2016161404 A1 | 10/2016 |

OTHER PUBLICATIONS

Gemalto, ePDG Configuration Information, 3GPP TSG CT WG6 #79, C6-160014, revision of C6-150635, Feb. 15-18, 2016, Jeju (South Korea).

* cited by examiner

GATEWAY ACCESS METHOD AND ELECTRONIC DEVICE

CROSS-REFERENCE TO RELATED APPLICATIONS

This application is a continuation application of International Application No. PCT/CN2021/084914 filed on Apr. 1, 2021, which claims priority to Chinese Patent Application No. 202010277683.0, filed in China on Apr. 8, 2020, which are incorporated herein by reference in their entireties.

TECHNICAL FIELD

The present invention relates to the field of communications technologies, and in particular, to a gateway access method and an electronic device.

BACKGROUND

At present, three networking solutions for VoWiFi (wireless voice) services are mainly available: untrusted access to 3GPP (third generation mobile communication) network (S2b interface, where the S2b interface is an interface between an ePDG and a packet data gateway PGW in an untrusted VoWiFi access solution), trusted access to 3GPP network (S2a interface, where the S2a interface is an interface between a terminal gateway TGW and a PGW in a trusted VoWiFi access solution), and direct access to an IP multimedia subsystem IMS (S2c interface, where the S2c interface is an interface between UE and a PGW in a VoWiFi IMS direct connection solution). From technical aspects of the three networking solutions, especially from the perspective of impact on networks and maturity of terminals, for operators that have deployed a large number of WLAN (Wireless Local Area Network) access points, if the trusted access to 3GPP network (S2a interface) solution is used, devices of the WLAN access points on the entire network need to be upgraded or directly replaced, requiring a long construction period, high costs and great difficulties. However, if the untrusted access to 3GPP network (S2b interface) solution is used, seamless voice switch between a WLAN and an LTE (Long Term Evolution) network can be implemented at lower costs because of combined characteristics of openness of public Wi-Fi (wireless) networks and high reliability and QoS (Quality of Service) guarantee of operator's core networks.

Therefore, the untrusted access to 3GPP network (S2b interface) solution gradually replaces the trusted access to 3GPP network (S2a interface) solution, and becomes a more feasible VoWiFi solution currently recognized by the industry. In this solution, user terminals access an operator's 3GPP network through an untrusted domain Wi-Fi network. After successful authentication, call requests are routed to an IMS for processing, to implement IMS services such as voice, SMS, and supplementary services. In addition, in the untrusted access to 3GPP network (S2b interface) solution, only an ePDG (Evolved Packet Data Gateway) and a 3GPP Authentication, Authorization, and Accounting (AAA) network element need to be added for implementing the VoWiFi service. The newly added ePDG network element plays a very important role of acting as a gateway for terminating an SWu interface (which is an interface between UE and the ePDG) oriented to an untrusted WiFi network. On the control plane, the ePDG interacts with the terminal by using Internet Key Exchange version 2 (IKEv2) messages to obtain extensible authentication protocol (EAP) authentication information, and encapsulates the information into a Diameter message to interact with the 3GPP AAA authentication Server (Authentication Authorization and Accounting Server, AAA Server) and home subscriber server (HSS) to implement user authentication. On the user plane, the ePDG decapsulates an Internet Protocol Security (IPSec) tunnel for encapsulating user data, and then re-encapsulates it into a GPRS Tunneling Protocol general packet radio service (GPRS) (GTP) tunnel to send to a packet gateway (P-GW).

Therefore, ePDG selection has an important impact on non-3GPP services such as VoWiFi. However, some existing ePDG selection access solutions have problems such as low efficiency, which affects efficiency of non-3GPP services such as VoWiFi.

SUMMARY

The present invention aims to provide a gateway access method and an electronic device.

The present invention is implemented as follows:

According to a first aspect, an embodiment of the present invention provides a gateway access method, applied to an electronic device. The method includes:
 determining a target ePDG based on a priority level of at least one pre-recorded evolved packet data gateway ePDG; and
 initiating an access procedure to the target ePDG based on pre-recorded address information; where
 the priority level includes a priority level that is determined based on access parameter information of the at least one ePDG; and
 the address information includes address information of the target ePDG.

According to a second aspect, an embodiment of the present invention further provides an electronic device, including:
 a first determining module, configured to determine a target ePDG based on a priority level of at least one pre-recorded evolved packet data gateway ePDG; and
 a first processing module, configured to initiate an access procedure to the target ePDG based on pre-recorded address information; where
 the priority level includes a priority level that is determined based on access parameter information of the at least one ePDG; and
 the address information includes address information of the target ePDG.

According to a third aspect, an embodiment of the present invention further provides an electronic device, including a processor, a memory, and a computer program stored in the memory and capable of running on the processor, where when the computer program is executed by the processor, the steps of the foregoing gateway access method are implemented.

According to a fourth aspect, an embodiment of the present invention further provides a computer-readable storage medium, where the computer-readable storage medium stores a computer program. When the computer program is executed by a processor, the steps of the foregoing gateway access method are implemented.

In the embodiments of the present invention, the target ePDG is determined based on the priority level of the at least one pre-recorded ePDG; and an access procedure is initiated to the target ePDG based on the pre-recorded address information, where the priority level includes a priority level that is determined based on access parameter information of the at least one ePDG, and the address information includes the address information of the target ePDG. In this way, when initiating a non-3GPP service again, the electronic device preferentially uses a pre-recorded ePDG for service processing, which can increase a registration success rate of the non-3GPP service to some extent. In addition, this can reduce steps and time of ePDG address query, and improve interaction efficiency between the UE and the ePDG, thereby improving efficiency of non-3GPP services and user experience. This resolves the problem of low efficiency in prior-art ePDG selection access solutions.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
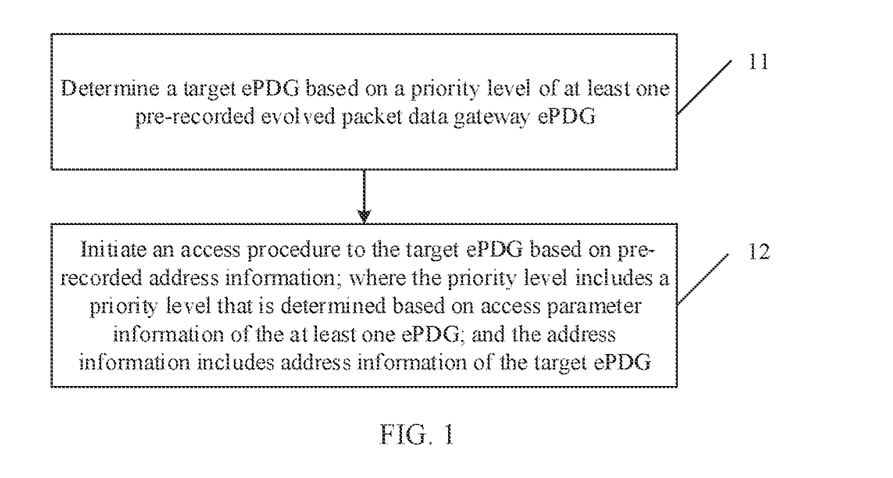
FIG. 1 is a schematic flowchart of a gateway access method according to an embodiment of the present invention.

In view of the problem of low efficiency in prior-art ePDG selection access solutions, the present invention provides a gateway access method, applied to an electronic device. As shown in FIG. 1, the method includes the following steps.

Step 11: Determine a target ePDG based on a priority level of at least one pre-recorded evolved packet data gateway ePDG.

Step 11 may be performed in a case that a non third generation mobile communication non-3GPP service is initiated, which is not limited thereto. Specifically, an ePDG with a higher priority level may be preferentially determined as the target ePDG based on an order of the priority levels, which is not limited thereto. In this way, an ePDG with better performance can be preferentially accessed, improving service performance.

Specifically, the determining a target ePDG based on a priority level of at least one pre-recorded evolved packet data gateway ePDG includes: determining, from the at least one ePDG, one ePDG as the target ePDG based on the priority level of the at least one pre-recorded ePDG.

Step 12: Initiate an access procedure to the target ePDG based on pre-recorded address information; where the priority level includes a priority level that is determined based on access parameter information of the at least one ePDG; and the address information includes address information of the target ePDG.

Specifically, the access parameter information includes load information and/or response duration information during access.

In the gateway access method provided in this embodiment of the present invention, the target ePDG is determined based on the priority level of the at least one pre-recorded ePDG; and an access procedure is initiated to the target ePDG based on the pre-recorded address information, where the priority level includes a priority level that is determined based on access parameter information of the at least one ePDG, and the address information includes the address information of the target ePDG. In this way, when initiating a non-3GPP service again, the electronic device preferentially uses a pre-recorded ePDG for service processing, which can increase a registration success rate of the non-3GPP service to some extent. In addition, this can reduce steps and time of ePDG address query, and improve interaction efficiency between the UE and the ePDG, thereby improving efficiency of non-3GPP services and user experience. This resolves the problem of low efficiency in prior-art ePDG selection access solutions.

Further, the method further includes: initiating an access procedure to at least one ePDG; and in a case of successful access, recording address information and access parameter information of the ePDG.

It should be noted here that the "initiating an access procedure to at least one ePDG" may be performed before the "determining the target ePDG", and specifically may be performed "in a case that a non third generation mobile communication non-3GPP service is initiated", which is not limited thereto.

This can facilitate subsequent use of the address information and access parameter information.

Further, the method further includes: determining a different target ePDG based on the priority level in a case that access to the target ePDG fails and initiating an access procedure to the determined different target ePDG; where a priority level of the determined different target ePDG is lower than a priority level of a previously determined target ePDG.

In this way, an ePDG access success rate can be further guaranteed.

Specifically, in a case that access to the target ePDG fails, the determining a different target ePDG based on the priority level in a case that access to the target ePDG fails and initiating an access procedure to the determined different target ePDG includes: cyclically performing the operation of determining a different target ePDG based on the priority level in a case that access to the target ePDG fails and initiating an access procedure to the determined different target ePDG, until all pre-recorded ePDGs are polled; obtaining an assigned ePDG address by querying ePDG information through static query or dynamic domain name system DNS query; and initiating an access procedure to a corresponding ePDG based on the allocated ePDG address.

In this way, proper access to ePDGs can be guaranteed to the greatest extent.

The gateway access method provided in this embodiment of the present invention is further described below. The electronic device being a terminal UE and the access parameter information being response duration information are used as examples. The address information and the response duration information being in a list form are used as an example.

In view of the foregoing technical problems, this embodiment of the present invention provides a gateway access method, which can be specifically implemented as an ePDG selection method. This solution can improve efficiency of non-3GPP services such as VoWiFi. This solution mainly includes the following.

An ePDG List {ePDG1, ePDG2, ..., ePDGn} is added on the UE side, where the list is used to record ePDG addresses used by the UE (that is, the address information), ePDG response time information (that is, the response duration information), and the like; and ePDGs in the list are sorted by information (which may also include load information and the like) such as ePDG response time. In this way, when initiating a non-3GPP service again, the UE preferentially uses an ePDG in the list for service processing. With this solution, a registration success rate and efficiency of non-3GPP services (which may also include non-3GPP services such as wireless video view VVWiFi) such as VoWiFi can be improved, thereby enhancing user experience.

Figure 2:
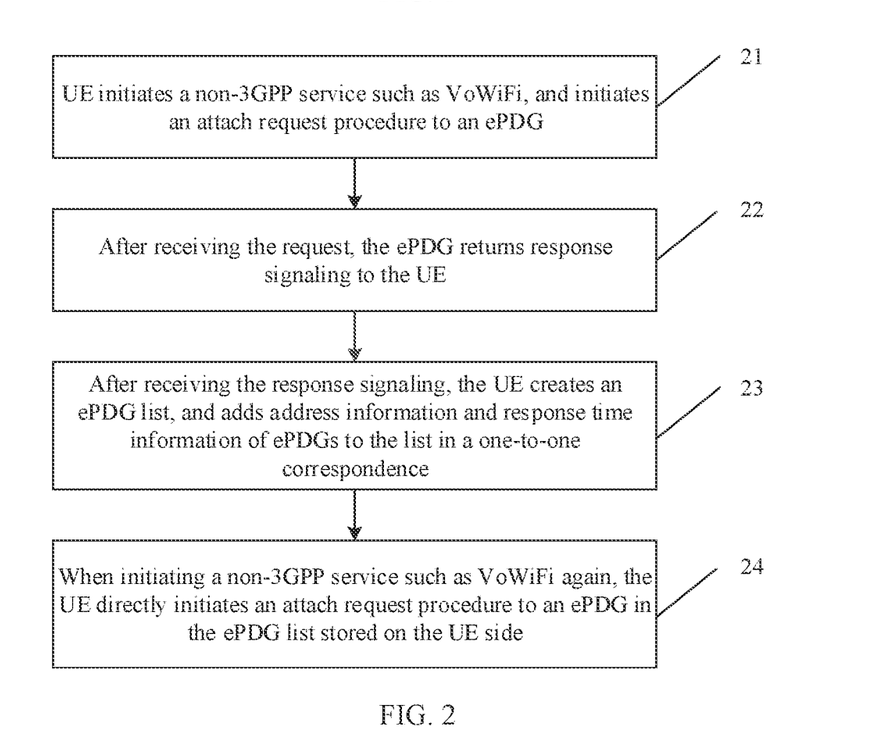
FIG. 2 is a schematic flowchart of a specific application of a gateway access method according to an embodiment of the present invention.

Specifically, the solution provided in this embodiment of the present invention may be as shown in FIG. 2, including the following steps.

Step 21: The UE initiates a non-3GPP service such as VoWiFi, and initiates an attach request procedure (that is, initiates an access procedure) to an ePDG.

Specifically, the UE initiates a non-3GPP service such as VoWiFi, queries ePDG information through static query or dynamic DNS (Domain Name System) query, and then initiates an attach request procedure to an assigned ePDG address.

Step 22: After receiving the request, the ePDG returns response signaling to the UE.

That is, after receiving the request signaling, the ePDG returns corresponding response signaling to the UE.

Step 23: After receiving the response signaling, the UE creates an ePDG list, and adds address information and response time information of ePDGs to the list in a one-to-one correspondence.

Specifically, after the UE receives the response signaling, the UE creates an ePDG list {ePDG1, ePDG2, ..., ePDGn}, where n is a length of the list and a value of n cannot be excessively large (properly about n=3-10, which is specifically determined by an implementation party), arranges ePDG identity information (for example, address information) and ePDG response time (a time between the request and the response) into a one-to-one correspondence, and then sorts the ePDGs in the ePDG list in descending order of response time.

Step 24: When initiating a non-3GPP service such as VoWiFi again, the UE directly initiates an attach request procedure to an ePDG in the ePDG list stored on the UE side.

Specifically, when initiating a non-3GPP service such as VoWiFi again, the UE directly initiates an attach request procedure to an ePDG in the ePDG list {ePDG1, ePDG2, ..., ePDGn} stored on the UE side as follows: first initiating an attach request procedure to the ePDG1; if access to the ePDG1 fails, initiating access to the ePDG2; if access to the ePDG2 also fails, trying a next one until the ePDGn; and if access to the ePDGn still fails, obtaining ePDG information through original static query or dynamic DNS query on the UE (for details, reference may be made to step 21, which is not repeated herein).

As can be seen from the above, in the solution provided in this embodiment of the present invention:

(1) An ePDG with optimal response time is stored on the UE side, and when the UE initiates a non-3GPP service, a registration success rate of the non-3GPP service such as VoWiFi can be increased to some extent; and (2) An ePDG with optimal response time is stored on the UE side, and when the UE initiates a non-3GPP service again, steps and time of ePDG address query are reduced, and interaction efficiency between the UE and the ePDG is improved.

Figure 3:
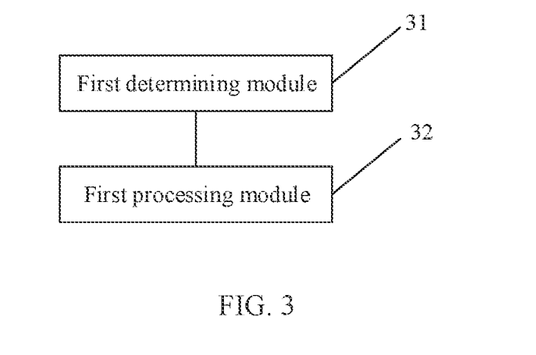
FIG. 3 is a first schematic structural diagram of an electronic device according to an embodiment of the present invention.

An embodiment of the present invention further provides an electronic device. As shown in FIG. 3, the electronic device includes:

a first determining module 31, configured to determine a target ePDG based on a priority level of at least one pre-recorded evolved packet data gateway ePDG; and a first processing module 32, configured to initiate an access procedure to the target ePDG based on pre-recorded address information; where the priority level includes a priority level that is determined based on access parameter information of the at least one ePDG; and the address information includes address information of the target ePDG.

The electronic device provided in this embodiment of the present invention determines the target ePDG based on the priority level of the at least one pre-recorded ePDG and initiates an access procedure to the target ePDG based on the pre-recorded address information, where the priority level includes a priority level that is determined based on access parameter information of the at least one ePDG, and the address information includes the address information of the target ePDG. In this way, when initiating a non-3GPP service again, the electronic device preferentially uses a pre-recorded ePDG for service processing, which can increase a registration success rate of the non-3GPP service to some extent. In addition, this can reduce steps and time of ePDG address query, and improve interaction efficiency between the UE and the ePDG, thereby improving efficiency of non-3GPP services and user experience. This resolves the problem of low efficiency in prior-art ePDG selection access solutions.

Specifically, the first determining module includes a first determining submodule, configured to determine, from the at least one ePDG, one ePDG as the target ePDG based on the priority level of the at least one pre-recorded ePDG.

Further, the electronic device further includes: a second processing module, configured to initiate an access procedure to at least one ePDG; and a first recording module, configured to: in a case of successful access, record address information and access parameter information of the ePDG.

In this embodiment of the present invention, the access parameter information includes load information and/or response duration information during access.

Further, the electronic device further includes: a third processing module, configured to determine a different target ePDG based on the priority level in a case that access to the target ePDG fails and initiate an access procedure to the determined different target ePDG, where a priority level of the determined different target ePDG is lower than a priority level of a previously determined target ePDG.

Specifically, the third processing module includes: a first processing submodule, configured to cyclically perform the operation of determining a different target ePDG based on the priority level in a case that access to the target ePDG fails and initiating an access procedure to the determined different target ePDG, until all pre-recorded ePDGs are polled; a second processing submodule, configured to obtain an assigned ePDG address by querying ePDG information through static query or dynamic domain name system DNS query; and a third processing submodule, configured to initiate an access procedure to a corresponding ePDG based on the allocated ePDG address.

The electronic device provided in this embodiment of the present invention can implement the processes implemented by the electronic device in the method embodiments in FIG. 1 and FIG. 2. To avoid repetition, details are not described herein again.

Figure 4:
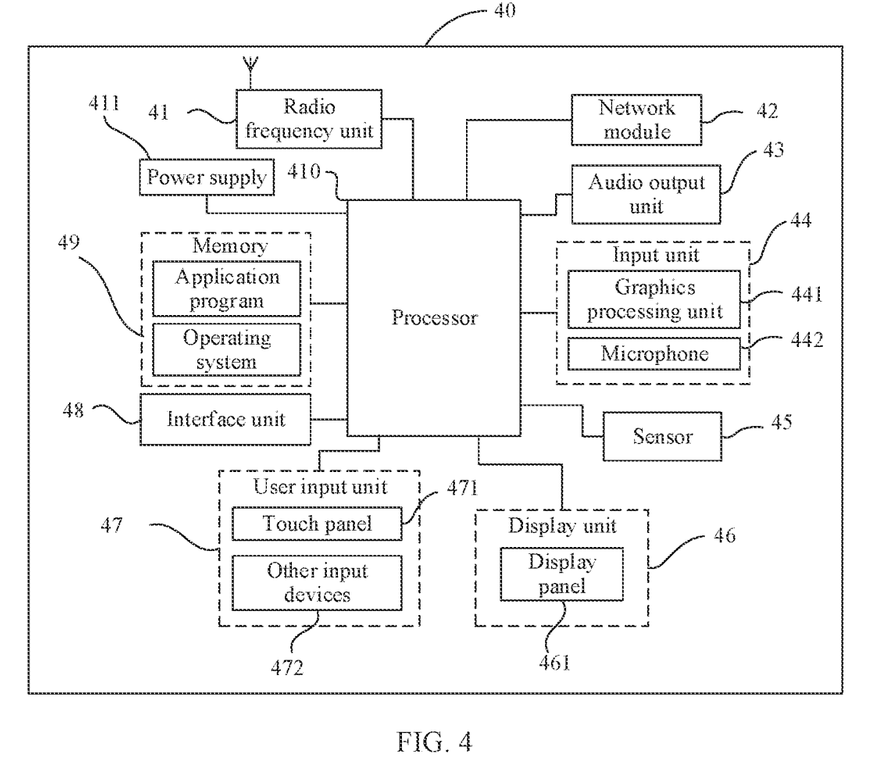
FIG. 4 is a second schematic structural diagram of an electronic device according to an embodiment of the present invention.

FIG. 4 is a schematic structural diagram of hardware of an electronic device for implementing the embodiments of the present invention. The electronic device 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that a structure of the electronic device shown in FIG. 4 constitutes no limitation to the electronic device, and the electronic device may include components more or fewer than those shown in the figure, or a combination of some components, or components disposed differently. In this embodiment of the present invention, the electronic device includes but is not limited to a mobile phone, a tablet computer, a laptop computer, a palmtop computer, an in-vehicle terminal, a wearable device, a pedometer, and the like.

The processor 410 is configured to determine a target ePDG based on a priority level of at least one pre-recorded evolved packet data gateway ePDG; and initiate an access procedure to the target ePDG based on pre-recorded address information, where the priority level includes a priority level that is determined based on access parameter information of the at least one ePDG, and a priority level of the determined different target ePDG is lower than a priority level of a previously determined target ePDG.

In this embodiment of the present invention, the target ePDG is determined based on the priority level of the at least one pre-recorded ePDG; and an access procedure is initiated to the target ePDG based on the pre-recorded address information, where the priority level includes a priority level that is determined based on access parameter information of the at least one ePDG, and the address information includes the address information of the target ePDG. In this way, when initiating a non-3GPP service again, the electronic device preferentially uses a pre-recorded ePDG for service processing, which can increase a registration success rate of the non-3GPP service to some extent. In addition, this can reduce steps and time of ePDG address query, and improve interaction efficiency between the UE and the ePDG, thereby improving efficiency of non-3GPP services and user experience. This resolves the problem of low efficiency in prior-art ePDG selection access solutions.

Optionally, the processor 410 is specifically configured to determine, from the at least one ePDG, one ePDG as the target ePDG based on the priority level of the at least one pre-recorded ePDG.

Optionally, the processor 410 is further configured to initiate an access procedure to at least one ePDG, and in a case of successful access, record address information and access parameter information of the ePDG.

Optionally, the access parameter information includes load information and/or response duration information during access.

Optionally, the processor 410 is further configured to: determine a different target ePDG based on the priority level in a case that access to the target ePDG fails and initiate an access procedure to the determined different target ePDG, where a priority level of the determined different target ePDG is lower than a priority level of a previously determined target ePDG.

Optionally, the processor 410 is specifically configured to: cyclically perform the operation of determining a different target ePDG based on the priority level in a case that access to the target ePDG fails and initiating an access procedure to the determined different target ePDG, until all pre-recorded ePDGs are polled; obtain an assigned ePDG address by querying ePDG information through static query or dynamic domain name system DNS query; and initiate an access procedure to a corresponding ePDG based on the allocated ePDG address.

It should be understood that in this embodiment of the present invention, the radio frequency unit 41 may be configured to: receive and transmit signals in an information receiving/sending process or a call process; and specifically, after receiving downlink data from a base station, transmit the downlink information to the processor 410 for processing, and in addition, transmit uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may also communicate with a network and other devices via a wireless communications system.

The electronic device provides a user with wireless broadband internet access through the network module 42, for example, helping the user to transmit and receive e-mails, browse web pages, and access streaming media.

The audio output unit 43 may convert audio data received by the radio frequency unit 41 or the network module 42 or stored in the memory 49 into an audio signal and output the audio signal as a sound. Furthermore, the audio output unit 43 may also provide audio output (for example, a call signal received sound or a message received sound) related to a specific function performed by the electronic device 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a still picture or a video obtained by an image capture apparatus (for example, a camera) in an image capture mode or a video capture mode. A processed image frame may be displayed on the display unit 46. The image frame processed by the graphics processing unit 441 may be stored in the memory 49 (or another storage medium) or be transmitted by the radio frequency unit 41 or the network module 42. The microphone 442 is capable of receiving sounds and processing such sounds into audio data. The processed audio data may be converted in a telephone call mode into a format that can be transmitted by the radio frequency unit 41 to a mobile communications base station, for outputting.

The electronic device 40 may further include at least one sensor 45, for example, an optical sensor, a motion sensor, and other sensors. Specifically, the optical sensor may include an ambient light sensor and a proximity sensor. The ambient light sensor may adjust luminance of the display panel 461 based on brightness of ambient light, and the proximity sensor may turn off the display panel 461 and/or backlight when the electronic device 40 moves close to an ear. As a type of motion sensor, an accelerometer sensor can detect magnitudes of accelerations in all directions (usually three axes), can detect a magnitude and a direction of gravity when the electronic device is in a static state, and can be applied to electronic device posture recognition (such as screen switching between portrait and landscape, related games, and magnetometer posture calibration), functions related to vibration recognition (such as pedometer and tapping), and the like. The sensor 45 may also include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided to the user. The display unit 46 may include the display panel 461. The display panel 461 may be configured in a form of a liquid crystal display (LCD), an organic light-emitting diode (OLED), or the like.

The user input unit 47 may be configured to receive input digit or character information and generate key signal input related to user setting and function control of the user equipment. Specifically, the user input unit 47 may include a touch panel 471 and other input devices 472. The touch panel 471 is also referred to as a touchscreen and can collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 410, and can receive a command transmitted by the processor 410 and execute the command. In addition, the touch panel 471 may be implemented in a plurality of forms, for example, as a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or an on/off key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. Although in FIG. 4, the touch panel 471 and the display panel 461 act as two independent parts to implement input and output functions of the electronic device, in some embodiments, the touch panel 471 and the display panel 461 may be integrated to implement the input and output functions of the electronic device. This is not specifically limited herein.

The interface unit 48 is an interface between an external apparatus and the electronic device 40. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 48 may be configured to: receive input (for example, data information and power) from the external apparatus, and transmit the received input to one or more elements in the electronic device 40, or may be configured to transmit data between the electronic device 40 and the external apparatus.

The memory 49 may be configured to store software programs and various data. The memory 49 may mainly include a program storage area and a data storage area. The program storage area may store an operating system, and an application program required by at least one function (for example, a sound playback function or an image playback function). The data storage area may store data (for example, audio data or a phone book) created according to use of the mobile phone. In addition, the memory 49 may include a high-speed random access memory, and may further include a non-volatile memory such as at least one disk storage device, a flash memory device, or another volatile solid-state storage device.

The processor 410 is a control center of the electronic device, and is connected to all components of the electronic device by using various interfaces and lines. By running or executing a software program and/or module that is stored in the memory 49 and calling data stored in the memory 49, the processor 410 executes various functions of the electronic device and processes data, so as to perform overall monitoring on the electronic device. The processor 410 may include one or more processing units. Preferably, the processor 410 may integrate an application processor and a modem processor. The application processor mainly processes the operating system, a user interface, an application program, and the like. The modem processor mainly processes wireless communication. It can be understood that the modem processor may alternatively be not integrated in the processor 410.

The electronic device 40 may further include the power supply 411 (such as a battery) for supplying power to the components. Preferably, the power supply may be logically connected to the processor 410 through a power management system. In this way, functions such as charge management, discharge management, and power consumption management are implemented by using the power management system.

In addition, the electronic device 40 includes some functional modules that are not shown, details of which are not described herein.

Preferably, an embodiment of the present invention further provides an electronic device, including a processor 410, a memory 49, and a computer program stored in the memory 49 and capable of running on the processor 410. When the computer program is executed by the processor 410, the processes of the foregoing gateway access method embodiment can be implemented, with the same technical effects achieved. To avoid repetition, details are not described herein again.

An embodiment of the present invention further provides a computer readable storage medium, where a computer program is stored in the computer readable storage medium. When the computer program is executed by a processor, the processes of the foregoing gateway access method embodiment can be implemented. To avoid repetition, details are not described herein again. The computer-readable storage medium is, for example, a read-only memory (ROM), a random access memory (RAM), a magnetic disk, or an optical disc.

It should be noted that the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . "

does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present invention essentially, or the part contributing to the related art, may be implemented in a form of a software product. The software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A gateway access method, applied to an electronic device and comprising:
    determining a target ePDG based on a priority level of at least one evolved packet data gateway (ePDG) pre-recorded by the electronic device; and
    initiating an access procedure to the target ePDG based on pre-recorded address information; wherein
    the priority level comprises a priority level that is determined based on access parameter information of the at least one ePDG; and
    the address information comprises address information of the target ePDG;
    wherein the method further comprises:
    determining a different target ePDG based on the priority level in a case that access to the target ePDG fails and initiating an access procedure to the determined different target ePDG; wherein
    a priority level of the determined different target ePDG is lower than a priority level of a previously determined target ePDG;
    wherein the determining the different target ePDG based on the priority level in a case that access to the target ePDG fails and initiating the access procedure to the determined different target ePDG comprises:
    cyclically performing the operation of determining the different target ePDG based on the priority level in a case that access to the target ePDG fails and initiating the access procedure to the determined different target ePDG, until all pre-recorded ePDGs are polled;
    obtaining an assigned ePDG address by querying ePDG information through static query or dynamic domain name system DNS query; and
    initiating an access procedure to a corresponding ePDG based on the allocated ePDG address.

2. The gateway access method according to claim 1, wherein the determining a target ePDG based on a priority level of at least one pre-recorded evolved packet data gateway ePDG comprises:
    determining, from the at least one ePDG, one ePDG as the target ePDG based on the priority level of the at least one pre-recorded ePDG.

3. The gateway access method according to claim 1, further comprising:
    before determining the target ePDG based on the priority level of the at least one ePDG pre-recorded by the electronic device, initiating an access procedure to an ePDG; and
    in a case of successful access, recording address information and access parameter information of the ePDG.

4. The gateway access method according to claim 1, wherein the access parameter information comprises load information and/or response duration information during access.

5. An electronic device, comprising a processor, a memory, and a computer program stored in the memory and capable of running on the processor, wherein when the computer program is executed by the processor, the steps of a gateway access method are implemented; wherein the method comprises:
    determining a target ePDG based on a priority level of at least one evolved packet data gateway (ePDG) pre-recorded by the electronic device; and
    initiating an access procedure to the target ePDG based on pre-recorded address information; wherein
    the priority level comprises a priority level that is determined based on access parameter information of the at least one ePDG; and
    the address information comprises address information of the target ePDG;
    wherein when the computer program is executed by the processor, further implements:
    determining a different target ePDG based on the priority level in a case that access to the target ePDG fails and initiating an access procedure to the determined different target ePDG; wherein
    a priority level of the determined different target ePDG is lower than a priority level of a previously determined target ePDG;
    wherein the determining the different target ePDG based on the priority level in a case that access to the target ePDG fails and initiating the access procedure to the determined different target ePDG comprises:
    cyclically performing the operation of determining the different target ePDG based on the priority level in a case that access to the target ePDG fails and initiating the access procedure to the determined different target ePDG, until all pre-recorded ePDGs are polled;
    obtaining an assigned ePDG address by querying ePDG information through static query or dynamic domain name system DNS query; and
    initiating an access procedure to a corresponding ePDG based on the allocated ePDG address.

6. The electronic device according to claim 5, wherein the determining a target ePDG based on a priority level of at least one pre-recorded evolved packet data gateway ePDG comprises:
    determining, from the at least one ePDG, one ePDG as the target ePDG based on the priority level of the at least one pre-recorded ePDG.

7. The electronic device according to claim 5, wherein when the computer program is executed by the processor, further implements:
   before determining the target ePDG based on the priority level of the at least one ePDG pre-recorded by the electronic device, initiating an access procedure to an ePDG; and
   in a case of successful access, recording address information and access parameter information of the ePDG.

8. The electronic device according to claim 5, wherein the access parameter information comprises load information and/or response duration information during access.

9. A non-transitory computer-readable storage medium, wherein a computer program is stored in the non-transitory computer-readable storage medium, and when the computer program is executed by a processor, the steps of a gateway access method are implemented, wherein the method comprises:
   determining a target ePDG based on a priority level of at least one evolved packet data gateway (ePDG) pre-recorded by the electronic device; and
   initiating an access procedure to the target ePDG based on pre-recorded address information; wherein
   the priority level comprises a priority level that is determined based on access parameter information of the at least one ePDG; and
   the address information comprises address information of the target ePDG;
   wherein when the computer program is executed by the processor, further implements:
   determining a different target ePDG based on the priority level in a case that access to the target ePDG fails and initiating an access procedure to the determined different target ePDG; wherein
   a priority level of the determined different target ePDG is lower than a priority level of a previously determined target ePDG;
   wherein the determining the different target ePDG based on the priority level in a case that access to the target ePDG fails and initiating the access procedure to the determined different target ePDG comprises:
   cyclically performing the operation of determining the different target ePDG based on the priority level in a case that access to the target ePDG fails and initiating the access procedure to the determined different target ePDG, until all pre-recorded ePDGs are polled;
   obtaining an assigned ePDG address by querying ePDG information through static query or dynamic domain name system DNS query; and
   initiating an access procedure to a corresponding ePDG based on the allocated ePDG address.

10. The non-transitory computer-readable storage medium according to claim 9, wherein the determining a target ePDG based on a priority level of at least one pre-recorded evolved packet data gateway ePDG comprises:
    determining, from the at least one ePDG, one ePDG as the target ePDG based on the priority level of the at least one pre-recorded ePDG.

11. The non-transitory computer-readable storage medium according to claim 9, wherein when the computer program is executed by the processor, further implements:
    before determining the target ePDG based on the priority level of the at least one ePDG pre-recorded by the electronic device, initiating an access procedure to an ePDG; and
    in a case of successful access, recording address information and access parameter information of the ePDG.

12. The non-transitory computer-readable storage medium according to claim 9, wherein the access parameter information comprises load information and/or response duration information during access.

* * * * *